Patented May 30, 1939

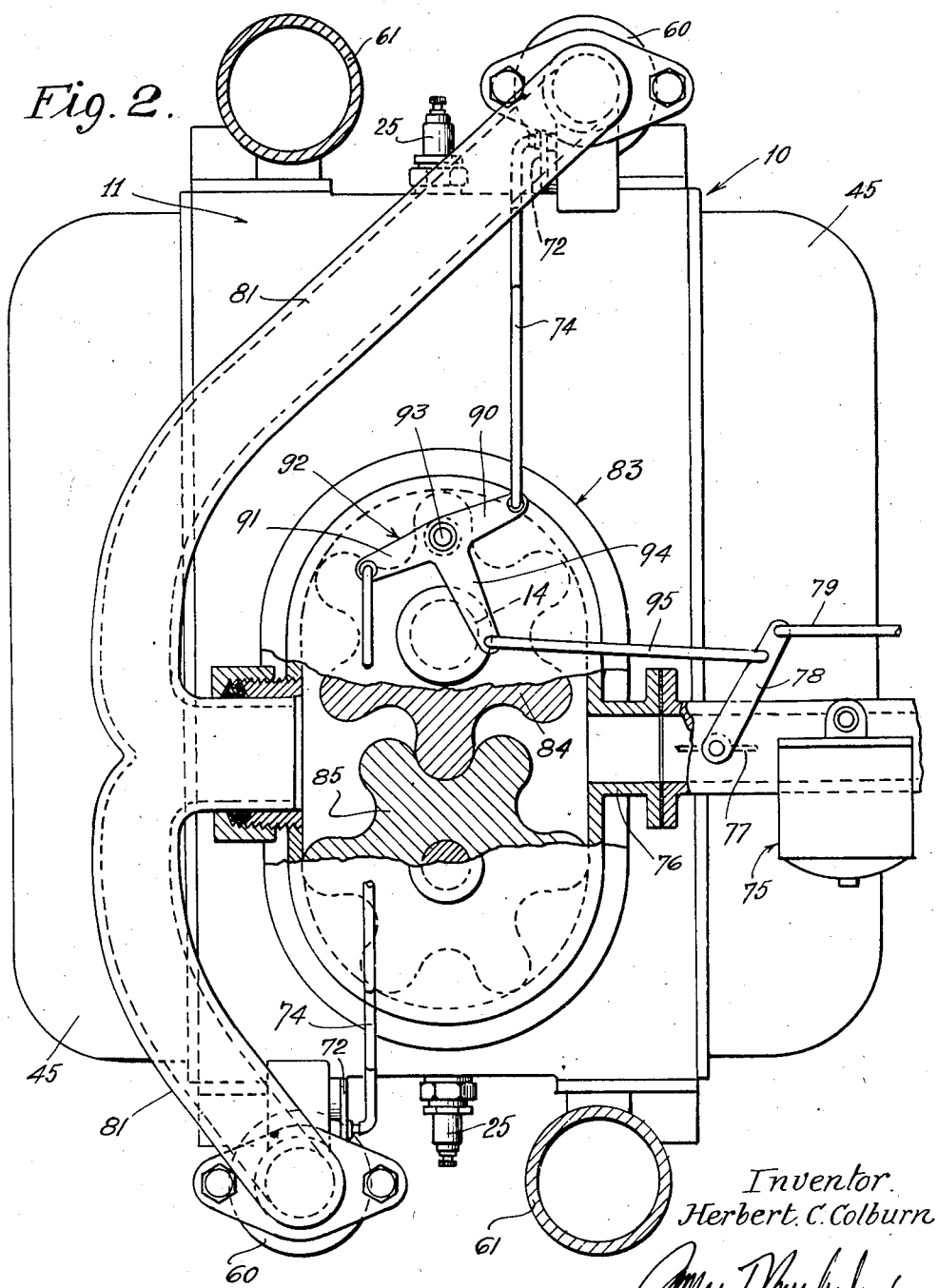

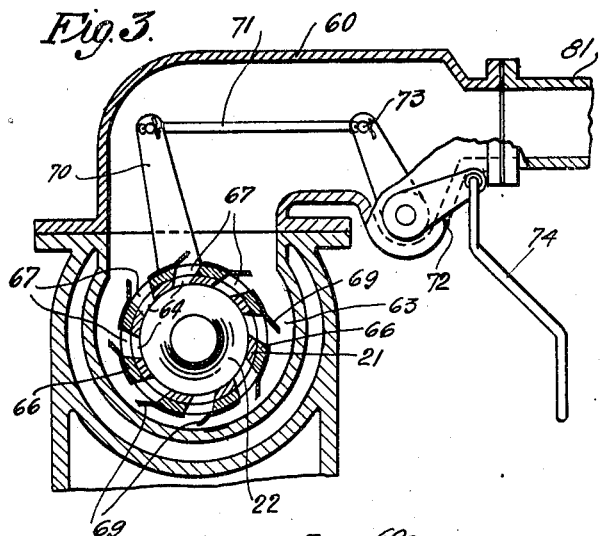
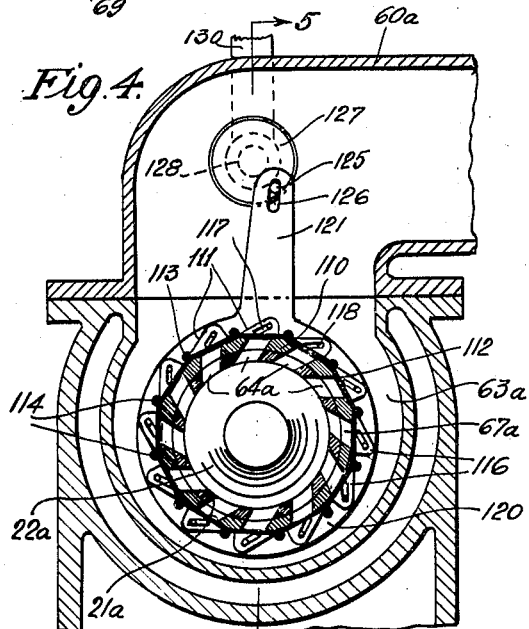
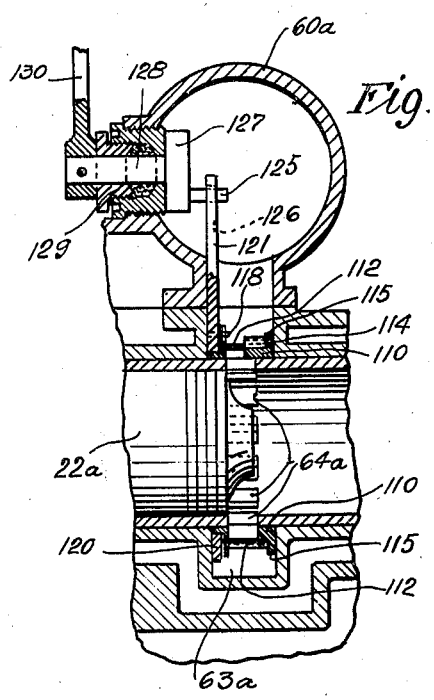
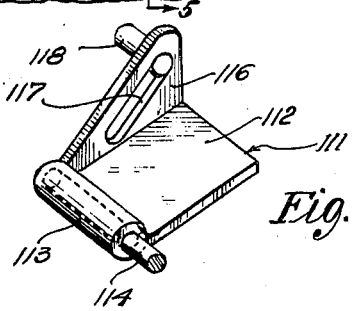

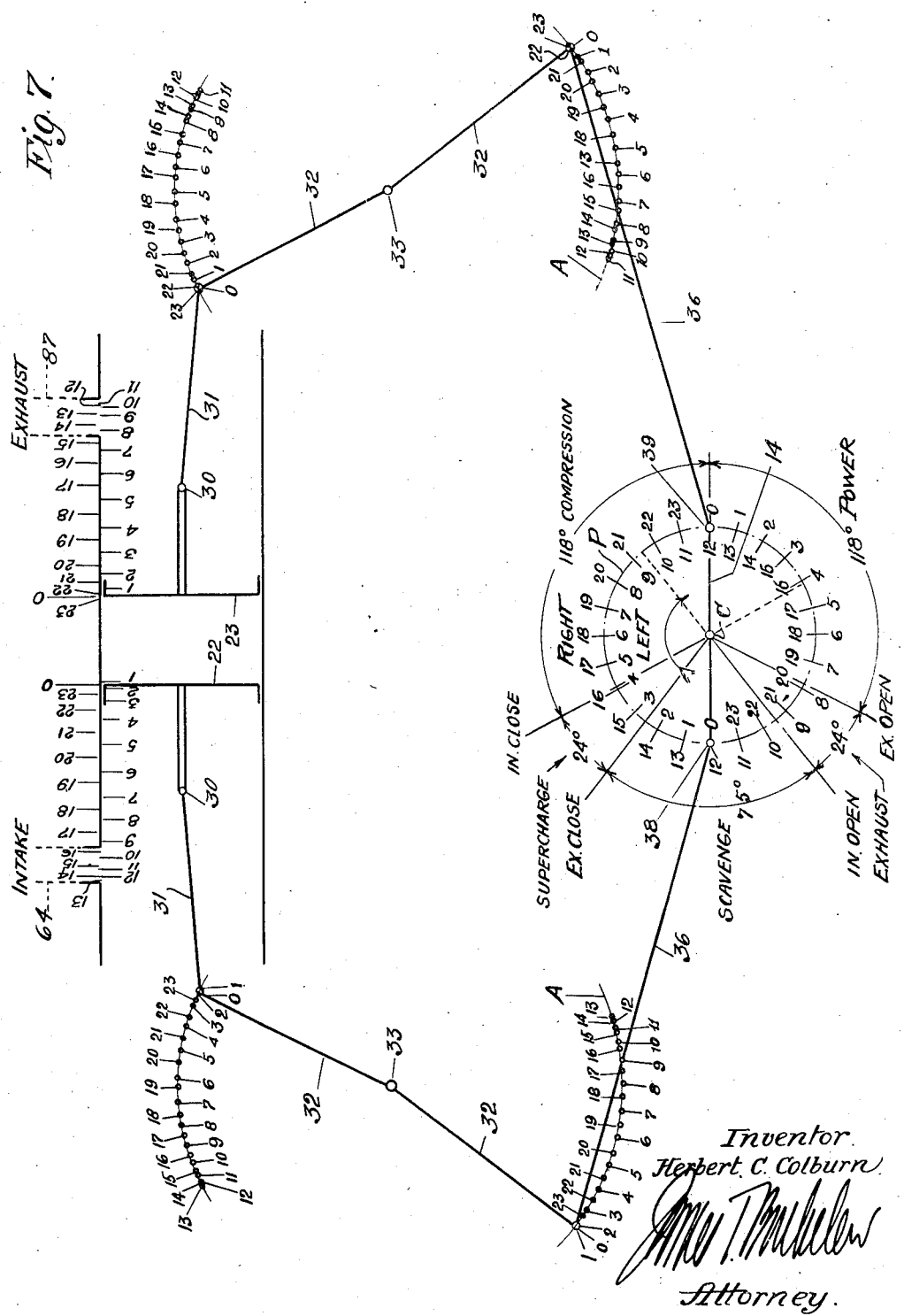

2,160,380

UNITED STATES PATENT OFFICE 2,160,380

INTERNAL COMBUSTION ENGINE

Herbert C. Colburn, South Pasadena, Calif., assignor to Colburn Engineering Corporation, Santa Monica, Calif., a corporation of Colorado Original application August 7, 1935, Serial No. 35,124, now Patent No. 2,112,829 dated April 5, 1938. Divided and this application August 11, 1936, Serial No. 95,366

10 Claims. (Cl. 123—51)

This invention relates generally to internal combustion engines, and particularly to internal combustion engines of the two cycle type. The present invention is typically illustrated as applied to an engine of the type in which two opposed pistons moved oppositely in a cylinder, the heads of the pistons defining an intermediate combustion chamber, and in which connecting rods extend outwardly from the pistons to connect with suitable linkage driving the crank shaft. It is to be understood, however, that while I here show the present invention as applied to an engine of the type mentioned, such typification constitutes no limitation on the invention in its broader aspects, which is applicable to other types of internal combustion engines as well.

The present application is a division of my copending application entitled "Internal combustion engine", filed August 7, 1935, Ser. No. 35,124, issued April 5, 1938, as Patent No. 2,112,829.

When an engine of the type mentioned is designed for two cycle operation, the cylinder is provided with an intake port near the outer limit of movement of one piston and with an exhaust port near the outer limit of movement of the other piston. When these pistons are at the outer limits of their stroke, both ports are uncovered and exhaust gases escape by the exhaust ports while fresh or carbureted air enters by the intake port. It is highly desirable in such an engine that the exhaust port be uncovered prior to opening of the intake port, and then be closed before the intake port is closed. This sequence of events has the dual advantage that the flame within the cylinder may escape through the exhaust port before the fresh charge is admitted to the intake port, thus obviating possibility of igniting the fresh charge and backfiring through the intake manifold, and also that the fresh charge, which is still entering the cylinder after the exhaust port has been closed, may be compressed through use of a super-charger to a pressure above atmospheric. I accomplish this sequence of events by providing a pair of rocking levers, one at each end of the cylinder, each such lever being connected at its upper ends to one of the piston cylinders, the lower ends of said rocking levers being connected by rods to the crank shaft, which extends below and at right angles to the axis of the cylinder, and the axis of the crank shaft being located below a line tangential to the arcs described by the pivotal connections between the lower extremities of the rock levers and the rods. Such relation between the parts causes one piston to move in advance of the other, as fully disclosed in my copending application of which this is a division, and in which the downwardly off-set placement of the crank shaft is particularly claimed.

In two cycle engines in general, difficulty is encountered in obtaining complete scavenging at all engine speeds, and at the same time preventing partial escape of the fresh charge with the exhaust gases at low engine speed. If the engine is so adjusted that at low speed the fresh charge of air just reaches the exhaust port at the time said port closes, then the fresh charge cannot reach the exhaust port in time to effect complete scavenging at high speed; and if complete scavenging at high speed is obtained then the fresh charge may reach and partly escape through the exhaust port before the exhaust port closes when the engine is operating at low speed. Usually, the engine is designed to effect substantially complete scavenging at high speed, with the result that a part of the fresh charge escapes with the exhaust gases at each stroke when the engine is operating at low speed. In this way, a two cycle engine is often much more uneconomical of fuel at low speeds than at high speeds.

It is a primary object of the present invention to provide a control means by which the rate of travel of the fresh charge through the cylinders is automatically related to engine speed, so that at all engine speeds the fresh charge completely scavenges the cylinder, without partially escaping with the exhaust gases.

In accordance with the preferred embodiment of the present invention, a supercharger is used of a positive displacement type, supplying a constant quantity of air per engine stroke for a given setting of the throttle. A variable opening shutter means is provided at the intake port, and this means is linked to some control member which moves with engine speed, as a governor, or the throttle in the air intake pipe. This shutter means automatically opens wider with increase of engine speed, and closes down as engine speed decreases, being effective throughout the entire speed range of the engine. Its effect is to restrict the flow of air at slow engine speed, so that under such conditions the air is just enabled to reach the exhaust port simultaneously with closure of said port, and to allow freer flow of air into the cylinder at higher speeds, so that the air is again enabled to reach the exhaust port simultaneously with closure thereof. It will be evident that this feature of the invention is applicable not only to the double opposed piston type of engine herein disclosed, but to two cycle engines in general, and the claims appended hereto are therefore not to be taken as limited to the double opposed type of engine except when expressly so restricted.

Further objects and features of the invention will appear from the following detailed description of a present preferred embodiment thereof, reference for this purpose being had to the accompanying drawings, in which:

Fig. 2 is an end elevation of the engine shown in Fig. 1, parts being broken away;

Fig. 3 is a section taken as indicated by line 3—3 of Fig. 1;

Fig. 4 is a view similar to Fig. 3 but showing a modification;

Fig. 5 is a vertical section taken as indicated by line 5—5 of Fig. 4;

Fig. 6 is a detail perspective of a shutter member shown on the device of Fig. 4; and Fig. 7 is a timing diagram of the two upper pistons of the engine of Fig. 1.

Figure 1:
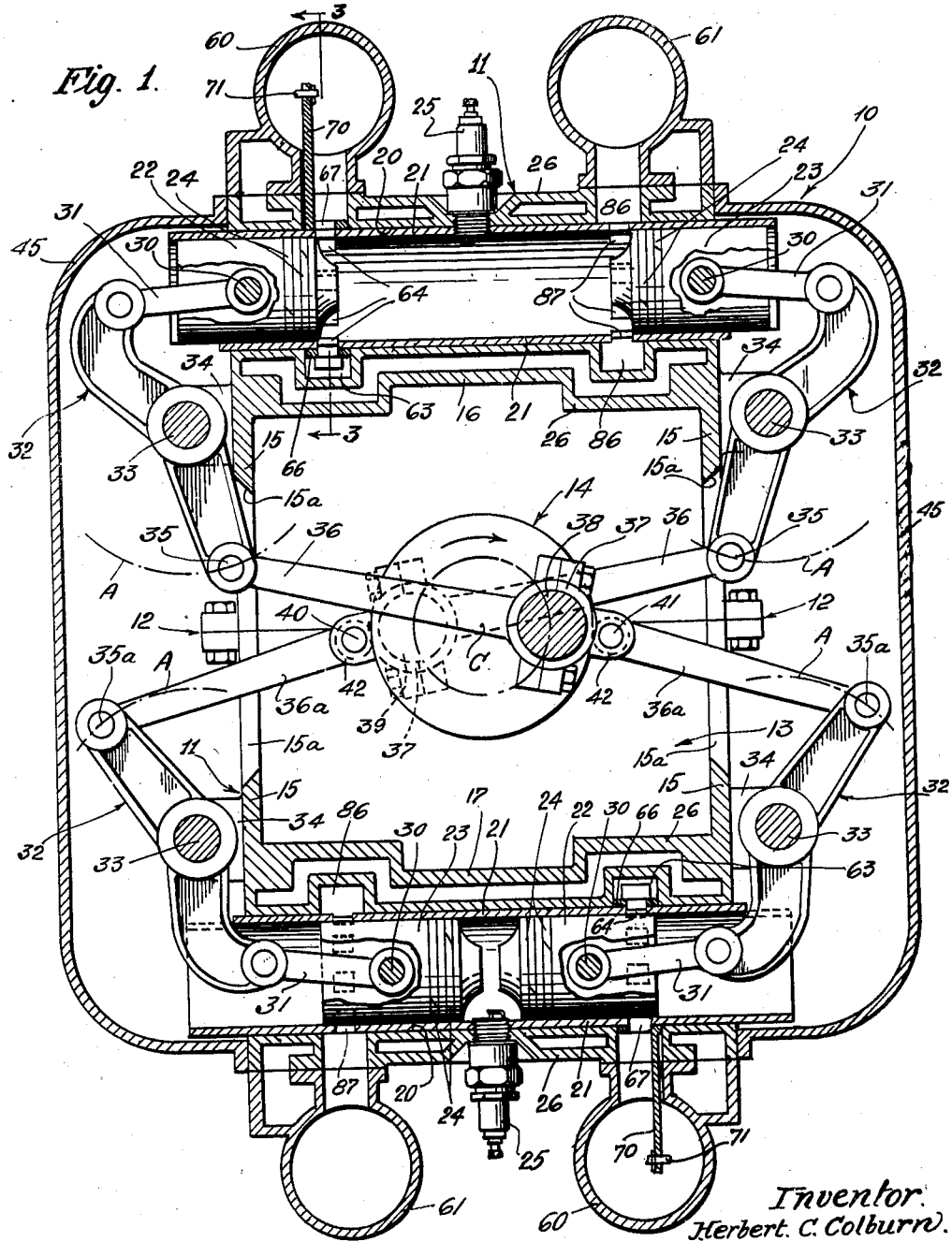
Fig. 1 is a vertical transverse section through the cylinders of a two cylinder two cycle engine embodying my invention.

In the drawings numeral 10 designates generally the engine of the present invention, which embodies a housing 11, split medially on a horizontal plane, the two halves being fastened together as at 12. The crank shaft 14 of the engine extends longitudinally through the central portion of a crank chamber 13 defined by side walls 15 and upper and lower walls 16 and 17, respectively, provided by said housing, the center line C of the crank shaft being in the plane of split of the housing, as shown. The upper and lower halves of housing 11 are provided, above and below crank chamber 13, with parallel, horizontally disposed cylinder bores 20 fitted with barrels 21, each adapted to receive a pair of opposed pistons 22 and 23. These pistons may be provided with any suitable oil rings 24, and are arranged with their head ends toward one another, so as to define an intermediate combustion chamber. In the engine here shown, the charge between the two pistons is exploded by a spark from a spark plug 25 extending through barrel 21, though any other manner of accomplishing combustion may be employed, if desired. The housing is shown provided with a suitable water jacket 26 surrounding cylinder bores 20.

Pistons 22 and 23 are provided with wrist pins 30, to which are pivotally connected rods 31 extending outwardly to pivotal connections with the outer extremities of rock levers 32, the latter being pivotally mounted at 33 on lugs 34 formed on the outer surfaces of housing side walls 15. To the inner ends of rock levers 32 are pivotally connected rods which drive the crank shaft. In the preferred form of the engine here shown, the lower ends of the upper rock levers are connected to the outer ends of rod 36, the inner ends of which are provided with straps 37 encircling 180° opposed crank pins 38 and 39. Lower rock levers 32, on the other hand, have connected thereto rods 36a, the inner ends of which are pivotally connected at 40 and 41 with lugs 42 formed on the inner extremities of upper rods 36, as clearly shown. The upper pistons therefore drive the crank directly through rods 36, while the lower pistons drive the crank through rods 36a and lugs 42 formed on rods 36. Rods 36 and 36a enter the crank chamber of the housing through apertures 15a formed in housing side walls 15. The rock levers and the ends of the cylinders are enclosed by casing members 45 mounted on the sides of the engine casting 11.

It will be noted that the axial center line C of the crank shaft lies below the arcs A described by the centers of the pivotal connections 35 between upper rock levers 32 and rods 36, and above the corresponding arcs described by the pivotal connections 35a between lower rock levers 32 connections 35a and rods 36a. This placement of the crank shaft relative to pivotal points 35 and 35a is essential to obtainment of the improved timing characteristic of the present invention, as will hereinafter be explained.

The pistons 22 and 23 of each cylinder work oppositely to one another. For instance, considering the upper cylinder of the engine of Fig. 1, an explosion between the pistons causes them to be driven outwardly and to operate through the rock levers and connecting rods to rotate the crank shaft, one piston, as piston 23, driving one crank pin through an understroke while the other piston, as piston 22, drives the 180° opposed crank pin on an overstroke. The pistons of the other or lower cylinder are opposed by 180 degrees of crank shaft rotation to those of the upper cylinder, that is, are at inward dead center at the time the upper pistons are at outward dead center, and vice versa (see Fig. 1). The pistons of the lower cylinder are also so connected to the crank pins as to exert a torque on the crank shaft, one piston driving one crank pin on an overstroke while the other piston drives the opposed crank pin on an understroke. It will be evident that the power strokes of the upper and lower pairs of pistons are in 180° opposition, the crank shaft receiving power impulses alternately from the upper and lower pairs of pistons.

The explosive mixture or charge is conveyed to each cylinder by way of an intake manifold 60, and the exploded gases are removed through an exhaust manifold 61. For the purpose of simplicity of explanation, the manifold and valve arrangements of only the upper cylinder will be described in detail, it being understood that exactly similar arrangements are provided for the lower cylinder. Intake manifold 60 communicates with an annular intake passage or chamber 63 formed in housing 11 and entirely surrounding piston barrel 21 (Figs. 1 and 3). This chamber 63 communicates with a series of intake ports 64 formed in barrel 21, these ports being uniformly spaced about the barrel and placed just within the outer limit of movement of the head end of the corresponding piston 22, which may be referred to as the intake piston.

The intake passage is provided with an adjustable shutter device, here in the form of a ring or sleeve 66 rotatably mounted on barrel 21 within annular intake chamber 63, sleeve 66 thus being disposed entirely around the intake ports 64. This sleeve 66 is provided with a series of uniformly spaced apertures 67 corresponding to intake ports 64 (see Fig. 3). When sleeve 66 is in the position shown in Fig. 3, its apertures 67 all register exactly with intake ports 64, so that a maximum freedom of air flow is obtained. It will be evident that rotation of sleeve 66 from the position shown in Fig. 3 will cause intake ports 64 to be gradually closed, thereby restricting the flow of air into the cylinder.

It will be noted that ports 64 and shutter apertures 67 are formed by slotting barrel 21 and sleeve 66 in directions offset to one side of the center line of the barrel. This has the effect of causing the intake charge to be given a spiral motion in entering the barrel, which is conducive to uniformity of distribution of the charge. To further enhance this effect, I prefer to mount a series of baffle members 69 on the sleeve, each of which extends outwardly from one side of a corresponding aperture 67, and is disposed at such an angle as to prolong the spiral path which the charge is forced to take in entering the cylinder.

Rotation of sleeve 66 in either direction is accomplished through the medium of an arm 70 extending upwardly from chamber 63 into manifold 60, a link 71 running longitudinally of manifold 60, and a rock lever 72 pivotally mounted in a wall of the manifold, the inner arm of said rock lever being pivotally connected at 73 to link 71, and the other arm of the rock lever, which is outside the manifold, being connected to a link 74, operated as later to be described.

Connected to the manifold 60 of each of the upper and lower cylinders is an intake pipe 81 leading from a supercharger 83, the latter being here indicated as of the positive displacement type. The specific supercharger here illustrated is of the gear type, comprising rotors 84 and 85, the form of which is keyed on the end of crank shaft 14. A supercharger of the type here shown delivers a fixed quantity of air per crank shaft revolution, for a given intake pressure. However, while a supercharger of the positive displacement type is preferred, the well known blower or impeller type of supercharger may be utilized, though with some sacrifice in operating characteristics in certain cases. The carbureter 75 is here shown as placed ahead of the supercharger, being directly coupled to the supercharger intake pipe 76. The engine is throttled by means of a butterfly valve 77 between the carbureter and the supercharger, valve 77 being here shown as operated by swinging arm 78 moved by manually controlled link 79. For the purpose of certain of the claims, the intake manifolds together with intake pipes 81 and 76 may be together referred to as the charge intake line.

In the form of the invention here shown, throttle 77 is interconnected with the rotatable shutter sleeves 66 surrounding the intake ports of the two cylinders, in such manner as to operate said sleeves throughout the range of movement of the throttle. For this purpose, links 74 connected to the shutter operating rock levers 72 are connected at their inner ends to the two oppositely extending arms 90 and 91 of a rock lever 92, which is pivoted at 93 on any suitable support. Lever 92 is provided with a third arm 94, extending at right angles to arms 90 and 91, to the end of which is pivotally connected one end of a link 95, the other end of which is connected to throttle operating arm 78, all as clearly shown in Fig. 2.

In the position shown in Figs. 2 and 3, throttle 77 is wide open, and shutter sleeves 66 are in such positions as to entirely uncover intake ports 64. It will be evident that movement of throttle arm 78 to close throttle 77 will rock lever 92 to move links 74 in an inward direction, thereby swinging rock levers 72 to cause rotation of shutter sleeve 66 and thereby gradually close intake ports 64 throughout movement of the throttle toward closed position. Thus intake ports 64 are progressively opened and closed in accordance with the full range of opening and closing movement of the throttle valve. The influence of this shutter action on operation of the engine will be further discussed at a later point in the specification.

The exhaust manifold 61 communicates with an annular chamber 86 entirely surrounding barrel 21 at the outer limit of movement of the head end of exhaust piston 23, a ring of exhaust ports 87 being formed in the wall of barrel 21 in such a position as to be just uncovered by the head end of piston 23 when the latter is at said outermost position, these exhaust ports 87 opening within chamber 86, all as indicated in Fig. 1.

The fresh charge is admitted to the cylinder through the intake port when the pistons are at the outer ends of their strokes, as they are in the upper cylinder in Fig. 1. This fresh charge advances in a column from the intake towards the exhaust port, which is also open, scavenging the cylinder of exploded gases. The pistons then move inwardly, closing both the intake and exhaust ports, and compressing the fresh charge until their inward limits of movement are reached. At this time the charge is exploded, as by a spark from plug 25, whereupon the pistons are driven outwardly to complete the cycle.

The exact sequence of events characteristic of the engine of the present invention will be more fully understood from a consideration of the timing diagram of Fig. 7, in which the pistons, connecting rods, rock levers and crank shaft are shown in single line diagram, but are given the same identifying numerals as were applied to Fig. 1. This diagram illustrates only the upper cylinder and its linkage connection with the crank shaft, since the timing characteristics of the lower cylinder are substantially the same. In this diagram the crank pin circle is designated at P, and is divided into twenty-four equal parts, each representing 15° of crank pin rotation. The letters on the outside of circle P represent successive 15° positions of crank pin 39, while the letters on the inside of the circle represent successive 15° positions of the 180° opposed crank pin 38. Corresponding positions of the rock levers and pistons are also indicated in the diagram, and are marked with the same numerals. In the position shown, crank pins 38 and 39 are both in a horizontal plane that passes through the center line C of the crank shaft, and in such position pistons 22 and 23 are just a few degrees off inward dead center. The engine may preferably be set to explode the charge at the position shown in Fig. 7, though of course this is not essential.

Due to the downward offset of crank shaft center line C from a line drawn tangentially to the arcs A described by the pivotal connections between rock levers 32 and rods 36, the piston 23 linked to the crank pin 39 which is moving through its understroke as the pistons travel outwardly moves with higher acceleration than does the piston 22 linked to the crank pin 38 which travels through its overstroke during outward movement of the piston. This will be readily apparent from inspection of the diagram of Fig. 7, exhaust piston 23 being shown to reach the exhaust port after 118° of crank shaft rotation from the full line position of the engine illustrated in the diagram, while intake piston 22 does not reach the intake port until the crank shaft has rotated through 142° from the same starting position. The exhaust port is therefore open 24° in advance of opening of the intake port. It will be evident from an inspection of Fig. 7 that this result is due to the fact that the crank pin that moves through the understroke has a component of motion away from its rock lever that is substantially greater than the component of motion of the other crank pin away from its rock lever during its corresponding overstroke. After opening of the intake port by intake piston 22, the exhaust piston continues to stay ahead of the intake piston, and recloses the exhaust port when the crank shaft has turned through an angle of 76° past the position at which the intake port was opened, while the intake port is not closed by piston 22 until the crank shaft has turned through an additional angle of 24°.

By virtue of this sequence of events, the exhaust piston 23 opens the exhaust port after 118° of power stroke, and the exhaust gases and residuary flame immediately begin to escape through this port. Before the intake port opens, 24° later, all of the flame has passed out of the cylinder, so that upon opening of the intake port and introduction of the fresh charge, there is no liability of backfiring.

The inertia of the exhaust gases rushing out through the exhaust ports causes the pressure in the cylinder to be finally depressed to some valve below atmospheric. Upon opening of the intake port, the fresh charge, under supercharger pressure, then rushes in and advances through the cylinder, driving the remaining burnt gases before it and out of the cylinder by way of the exhaust ports. The rate of inlet of this fresh charge is so adjusted, in the manner hereinafter explained, that the fresh charge just reaches the exhaust port at the time said port is closed by piston 23 in moving through its inward stroke. This closure of the exhaust port occurs 76° after opening of the intake port, thus affording a suitable scavenging period.

As previously noted, the intake port is open for 24° after the exhaust port is closed. This enables the supercharger 83 to raise the pressure of the mixture in the cylinder to more than atmospheric before closure of the intake port and commencement of the compression stroke. After closure of the intake port by piston 22, the gases are compressed for 118° of crank shaft rotation, thus completing the cycle.

It has previously been described how the shutter ring 66 disposed about the intake port is automatically moved to open and close said port with increase and decrease of engine speed. The effect of this shutter action is as follows. It has previously been explained that the supercharger is of the positive displacement type, and it will be evident that the shutter device 66 will therefore not have an effect upon the quantity of air passing into the cylinder, but will affect the rate of flow into the cylinder during the time the intake port is open. At maximum engine speeds, the shutter is wide open, as in Fig. 3, and air flow into the cylinder is unrestricted by the shutter, and therefore moves through the cylinder to scavenge it of burnt gases with maximum velocity. As engine speed is decreased below maximum, the intake ports are progressively closed by the shutter device, and air flow into the cylinder is restricted, with the result that additional time is required for the fresh air to travel the length of the cylinder. The relations of the various levers and links of the shutter and throttle control mechanism is made such that in both cases, as well as at intermediate speeds, the shutter device establishes the rate of air flow into the cylinder at such a value that the fresh charge will just reach the exhaust port as said port is closed, thus assuring complete scavenging of the cylinder at all speeds of the engine, and also preventing partial loss of the fresh charge through the exhaust port at low engine speeds. The described air velocity control or shutter device of course has no effect upon the final quantity of air introduced to the cylinder, but does affect the rate at which the initial air enters the cylinder and travels to the exhaust port. It is desirable that the shutter device be located immediately adjacent the inlet ports opening into the cylinder, rather than at some point back in the intake manifold, for if the shutter were placed in the latter situation, there would be no control or restriction on entry into the cylinder, as the intake ports open, of that air between the shutter and the intake ports, which at low engine speed would tend to rush into and through the cylinder with undesirably high velocity.

A modified shutter mechanism is shown in Figs. 4, 5 and 6. The intake manifold is indicated at 60a, the annular intake chamber surrounding the barrel at 63a, the barrel at 21a, and the intake ports at 64a. Surrounding barrel 21a, within chamber 63a, is a sleeve 110 provided with apertures 67a registering with ports 64a, as illustrated. This sleeve 110, while similar to the apertured sleeve 66 of the form of Fig. 3, is not rotatable on the barrel, being tightly fixed in the position shown in Fig. 4. Mounted on the outside of sleeve 110 are movable shutter members 111 adapted to open and close aperture 67a. Said shutter members 111, one of which is shown in perspective in Fig. 6, comprise shutter plates 112 hinged at one edge, as at 113, on pins 114 set into an outwardly extending annular flange 115 on sleeve 110. At the side edge of each plate 112 is a flange 116 provided with an angular slot 117, and engaging in slots 117 are pins 118 mounted in a ring member 120 surrounding and rotatable on one end of sleeve 110. This ring has an operating arm 121 extending within manifold 60a. Movement of arm 121 causes ring 120 to rotate about sleeve 110, whereby pins 118 engaging in angular slots 117 of shutter members 111 cause said members to swing in and out to control the inlet ports. As here shown, arm 121 is operated by means of a pin 125 engaging in a slot 126 in its upper end, said pin 125 being mounted on a crank disk 127 on the inner end of a shaft 128 journalled in a bearing 129 mounted in a side wall of manifold 60a, said bearing being suitably packed, as shown. The outer end of shaft 128 is indicated as operated by means of a lever arm 130, which may be understood to be operated in relation to engine speed in any desired manner. It will be evident that the shutter device in the form of Figs. 4, 5 and 6 accomplishes the same result as does the shutter device of Fig. 3.

It will be understood the drawings and description are to be considered merely as illustrative of and not restrictive on the broader claims appended hereto, since various changes in design, structure, and arrangement may be made without departing from the spirit and scope of said claims.

I claim:

1. In a two cycle internal combustion engine embodying a cylinder having piston controlled intake and exhaust ports, a charge intake line connected to said intake port, and a throttle valve in said intake line: a variable opening shutter device located at the discharge end of the intake line immediately adjacent the intake port and adapted to vary the rate of flow of charge from the discharge end of the intake line into the cylinder, and automatic means for progressively opening and closing said shutter device in accordance with increase and decrease in engine speed throughout substantially the entire speed range of the engine.

2. In a two cycle internal combustion engine embodying a cylinder having piston controlled intake and exhaust ports, a charge intake line connected to said intake port, and a throttle valve in said intake line: a variable opening shutter device located at the discharge end of the intake line immediately adjacent the intake port and adapted to vary the rate of flow of charge from the discharge end of the intake line into the cylinder, and means operatively interconnecting with the throttle valve in such manner as to cause the shutter device to open and close in accordance with opening and closing of the throttle valve throughout substantially the entire range of movement of the throttle valve.

3. In a two cycle internal combustion engine embodying a cylinder having piston controlled intake and exhaust ports, a charge intake line connected to said intake port, a throttle valve in said intake line and a supercharger in said intake line: a variable opening shutter device located at the discharge end of the intake line immediately adjacent the intake port and adapted to vary the rate of flow of charge from the discharge end of the intake line into the cylinder, and automatic means for progressively opening and closing said shutter device in accordance with increase and decrease in engine speed throughout substantially the entire speed range of the engine.

4. In a two cycle internal combustion engine embodying a cylinder having piston controlled intake and exhaust ports, a charge intake line connected to said intake port, a throttle valve in said intake line and a supercharger in said intake line: a variable opening shutter device located at the discharge end of the intake line immediately adjacent the intake port and adapted to vary the rate of flow of charge from the discharge end of the intake line into the cylinder, and means operatively interconnecting with the throttle valve in such manner as to cause the shutter device to open and close in accordance with opening and closing of the throttle valve throughout substantially the entire range of movement of the throttle valve.

5. In a two cycle internal combustion engine embodying a cylinder, a pair of oppositely moving pistons working therein, an intake port in the cylinder just within the outer stroke limit of one piston, an exhaust port in the cylinder just within the outer stroke limit of the other piston, a charge intake line connected to said intake port, and a throttle valve in said intake line: a variable opening shutter device located at the discharge end of the intake line immediately adjacent the intake port and adapted to vary the rate of flow of charge from the discharge end of the intake line into the cylinder, and automatic means for progressively opening and closing said shutter device in accordance with increase and decrease in engine speed throughout substantially the entire speed range of the engine.

6. In a two cycle internal combustion engine embodying a cylinder, a pair of oppositely moving pistons working therein, an intake port in the cylinder just within the outer stroke limit of one piston, an exhaust port in the cylinder just within the outer stroke limit of the other piston, a charge intake line connected to said intake port and a throttle valve in said intake line: a variable opening shutter device located at the discharge end of the intake line immediately adjacent the intake port and adapted to vary the rate of flow of charge from the discharge end of the intake line into the cylinder and means operatively interconnecting with the throttle valve in such manner as to cause the shutter device to open and close in accordance with opening and closing of the throttle valve throughout substantially the entire range of movement of the throttle valve.

7. In a two cycle internal combustion engine embodying a cylinder, a pair of oppositely moving pistons working therein, an intake port in the cylinder just within the outer stroke limit of one piston, an exhaust port in the cylinder just within the outer stroke limit of the other piston, a charge intake line connected to said intake port, a throttle valve in said intake line and a supercharger in said intake line between said throttle valve and the intake port: a variable opening shutter device located at the discharge end of the intake line immediately adjacent the intake port and adapted to vary the rate of flow of charge from the discharge end of the intake line into the cylinder, and automatic means for progressively opening and closing said shutter device in accordance with increase and decrease in engine speed throughout substantially the entire speed range of the engine.

8. In a two cycle engine, the combination of a cylinder barrel having a series of circumferentially spaced piston controlled intake ports extending through its wall, and a sleeve rotatably mounted on said barrel over said intake ports and having apertures adapted to register with said intake ports, said intake ports and sleeve apertures extending inwardly in directions offset from the central axis of the cylinder, whereby a spiral motion is imparted to air forced inwardly through said apertures and slots.

9. In a two cycle engine, the combination of a cylinder barrel having a series of circumferentially spaced piston controlled charge intake ports extending through its wall, a sleeve mounted for relative movement on said barrel over said intake ports and having apertures adapted to be registered with said intake ports, means for moving said sleeve on said barrel, and a charge intake chamber enclosing a space around the apertured portion of said sleeve.

10. In a two cycle engine, the combination of a cylinder barrel having a series of circumferentially spaced piston controlled charge intake ports extending through its wall, a sleeve mounted for rotation on said barrel over said intake ports and having apertures adapted to be registered with said intake ports, means for rotating said sleeve on said barrel, and a charge intake chamber enclosing a space around the apertured portion of said sleeve.

HERBERT C. COLBURN.